United States Patent
Nareddy et al.

(10) Patent No.: US 10,949,586 B1
(45) Date of Patent: Mar. 16, 2021

(54) POST-SYNTHESIS INSERTION OF DEBUG CORES

(71) Applicant: Xilinx, Inc., San Jose, CA (US)

(72) Inventors: Jaipal R. Nareddy, Hyderabad (IN); Suman Kumar Timmireddy, Hyderabad (IN); Rahul Gupta, Hyderabad (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/918,228

(22) Filed: Jul. 1, 2020

(51) Int. Cl.
*G06F 30/327* (2020.01)
*G06F 30/394* (2020.01)
*G06F 115/02* (2020.01)

(52) U.S. Cl.
CPC .......... *G06F 30/327* (2020.01); *G06F 30/394* (2020.01); *G06F 2115/02* (2020.01)

(58) Field of Classification Search
CPC ... G06F 30/327; G06F 30/394; G06F 2115/02
See application file for complete search history.

(56) References Cited

U.S. PATENT DOCUMENTS

| | | | | |
|---|---|---|---|---|
| 6,247,147 B1* | 6/2001 | Beenstra | ............... | G06F 30/331 714/39 |
| 6,760,898 B1* | 7/2004 | Sanchez | ......... | G01R 31/318519 716/111 |
| 7,036,046 B2* | 4/2006 | Rally | ............. | G01R 31/318357 714/39 |
| 7,072,818 B1* | 7/2006 | Beardslee | ........ | G01R 31/31705 703/14 |
| 9,041,431 B1* | 5/2015 | Herrmann | ........ | G01R 31/31705 326/39 |
| 9,298,865 B1* | 3/2016 | Peng | ....................... | G06F 30/33 |
| 9,753,084 B2* | 9/2017 | Tamiya | ............ | G01R 31/31705 |
| 10,126,361 B1* | 11/2018 | Yang | ..................... | G06F 30/331 |
| 10,161,999 B1* | 12/2018 | Nand | ................. | G01R 31/3177 |
| 10,481,990 B2* | 11/2019 | Eder | ....................... | G06F 11/25 |
| 10,698,805 B1* | 6/2020 | Ovadia | .............. | G06F 11/3636 |
| 2001/0037477 A1* | 11/2001 | Veenstra | ............ | G01R 31/3177 714/41 |

(Continued)

OTHER PUBLICATIONS

Xilinx, Vivado Design Suite User Guide: Programming and Debugging, www.xilinx.com, UG908 (v2018.2), Jun. 6, 2018.

(Continued)

*Primary Examiner* — Nha T Nguyen
(74) *Attorney, Agent, or Firm* — Crawford Maunu PLLC

(57) ABSTRACT

Approaches for post-synthesis insertion of debug cores include a programmed processor inputting data that identify signals of a synthesized circuit design to be probed and determining whether or not debug cores and interfaces needed to probe the signals are absent from the circuit design. The programmed processor creates, in response to determining that the debug cores and interfaces are absent, the debug cores and interfaces in the circuit design. The programmed processor couples the debug cores and interfaces to the signals in the circuit design and synthesizes the debug cores and interfaces created in the circuit design to create a modified circuit design. The method includes generating a circuit definition from the modified circuit design by the programmed processor, and implementing a circuit that operates according to the circuit definition.

20 Claims, 13 Drawing Sheets

(56) References Cited

U.S. PATENT DOCUMENTS

| | | | |
|---|---|---|---|
| 2002/0133794 A1* | 9/2002 | Kanapathippillai | ........................ G01R 31/31705 716/136 |
| 2002/0144235 A1* | 10/2002 | Simmers | ............. G06F 11/3648 717/124 |
| 2004/0181385 A1* | 9/2004 | Milne | ..................... G06F 30/33 703/14 |
| 2005/0022062 A1* | 1/2005 | Vorbach | ............. G06F 9/30036 714/38.14 |
| 2006/0041803 A1* | 2/2006 | Woodward | ......... G01R 31/3177 714/724 |
| 2007/0260929 A1* | 11/2007 | Liu | ..................... G06F 11/3644 714/38.14 |
| 2011/0283141 A1* | 11/2011 | Lee | .......................... G06F 1/32 714/30 |
| 2013/0318403 A1* | 11/2013 | Kim | .................... G06F 11/3636 714/38.1 |
| 2014/0095932 A1* | 4/2014 | Mangano | ................ G06F 11/27 714/30 |
| 2015/0149843 A1* | 5/2015 | Finan | ............. G01R 31/318519 714/726 |
| 2015/0227410 A1* | 8/2015 | Jarrett | ................. G06F 11/3476 714/45 |
| 2016/0054388 A1* | 2/2016 | Tamiya | ............ G01R 31/31705 714/736 |
| 2016/0282413 A1* | 9/2016 | Tamiya | ............ G01R 31/31703 |
| 2016/0327610 A1* | 11/2016 | Ichiba | .............. G01R 31/31705 |
| 2017/0074932 A1* | 3/2017 | Kourfali | ........ G01R 31/318519 |
| 2017/0154137 A1* | 6/2017 | Shakeri | ................... G06F 30/18 |
| 2017/0269157 A1* | 9/2017 | Mao | ..................... G06F 12/1027 |
| 2018/0088174 A1* | 3/2018 | Davis | ................. G01R 31/3172 |
| 2019/0243736 A1* | 8/2019 | Lee | ......................... G06F 1/3206 |
| 2019/0271740 A1* | 9/2019 | Gu | .................. G01R 31/31705 |
| 2019/0303268 A1* | 10/2019 | Ansari | ............ G01R 31/31705 |
| 2020/0174071 A1* | 6/2020 | Panwar | ............... G06F 9/30141 |

OTHER PUBLICATIONS

Xilinx, Vivado Design Suite User Guide: Release Notes, Installation, and Licensing, www.xilinx.com, UG973 (v2019.2), Dec. 17, 2019.

* cited by examiner

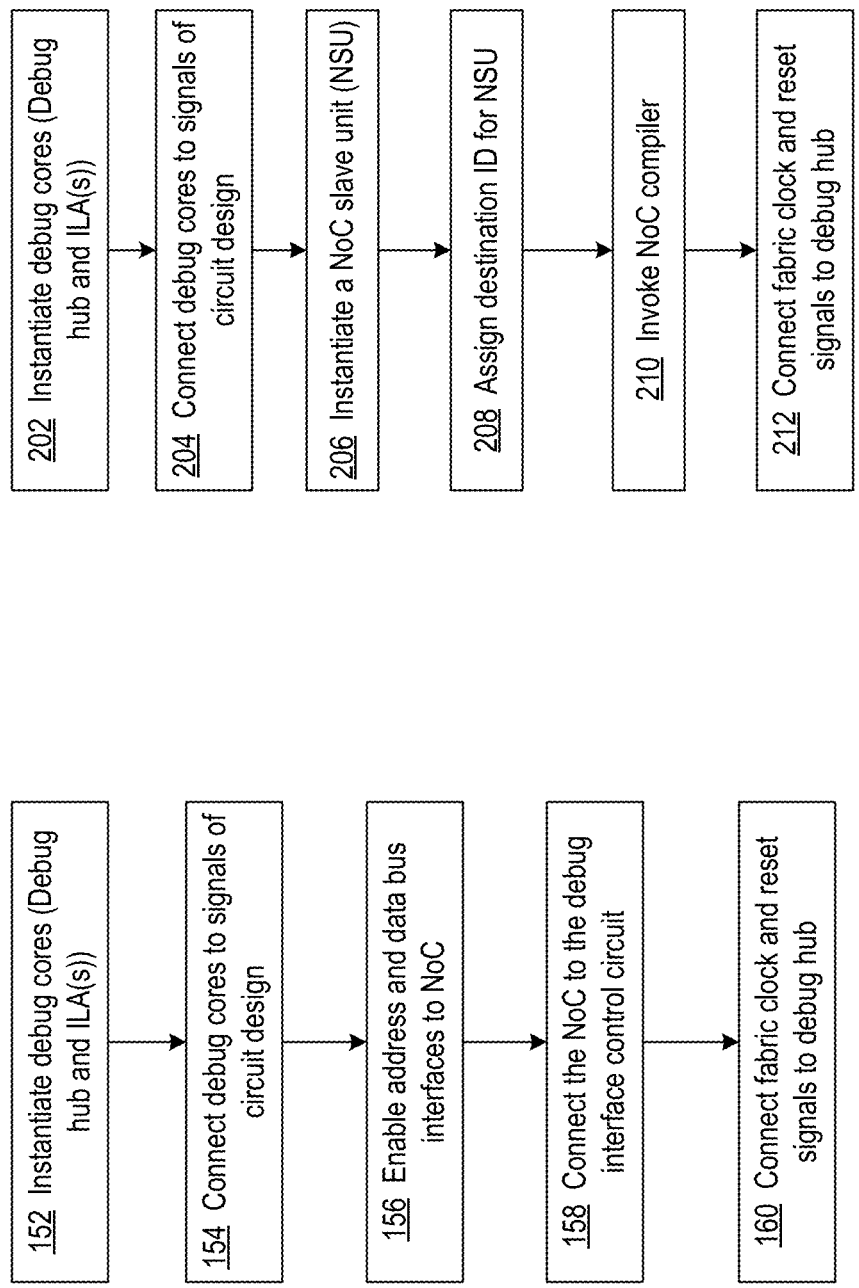

10,949,586 B1

POST-SYNTHESIS INSERTION OF DEBUG CORES

TECHNICAL FIELD

The disclosure generally relates to debugging circuit designs.

BACKGROUND

Debugging a circuit design after the design has been implemented as an operable circuit can be difficult and time-consuming. Being unaware of an error in a circuit design during the design phase, a designer will not know which signals will need to be probed if an error is discovered once the circuit is implemented and operable. In addition, the target device on which a circuit design is implemented can further complicate debugging. For example, system-on-chip (SoC) platforms can make debugging a circuit design even more difficult because the interfaces needed to access the desired signals of the circuit design may be slow in operation or complex to integrate with the circuit design.

SUMMARY

A disclosed method includes inputting to a programmed processor, data that identify signals of a circuit design to be probed. The method includes determining by the programmed processor, whether or not debug cores and interfaces needed to probe the signals are absent from the circuit design. The programmed processor creates, in response to determining that the debug cores and interfaces are absent, the debug cores and interfaces in the circuit design. The programmed processor couples the debug cores and interfaces to the signals in the circuit design and synthesizes the debug cores and interfaces created in the circuit design to create a modified circuit design. The method includes generating a circuit definition from the modified circuit design by the programmed processor, and implementing a circuit according to the circuit definition.

A disclosed system includes a processor arrangement and a memory circuit coupled to the processor arrangement. The memory circuit is configured with instructions that when executed by the processor arrangement cause the processor arrangement to perform operations including inputting data that identify signals of a circuit design to be probed; determining whether or not debug cores and interfaces needed to probe the signals are absent from the circuit design; creating, in response to determining that the debug cores and interfaces are absent, the debug cores and interfaces in the circuit design; coupling the debug cores and interfaces to the signals in the circuit design; synthesizing the debug cores and interfaces created in the circuit design to create a modified circuit design; generating a circuit definition from the modified circuit design; and implementing a circuit according to the circuit definition.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which:

FIG. 3 shows a flowchart of a process that adds circuitry and interfaces to a circuit design that has a debug interface control circuit but does not have a NoC-AXI interface to the debug interface control circuit;

FIG. 4 shows a flowchart of a process that adds circuitry and interfaces to a circuit design that has a debug interface control circuit and a NoC-AXI interface to the debug interface control circuit;

FIG. 13 shows a flowchart of a process that adds circuitry and interfaces to a circuit design that employs dynamic function exchanges (DFX);

DETAILED DESCRIPTION

Figure 1:
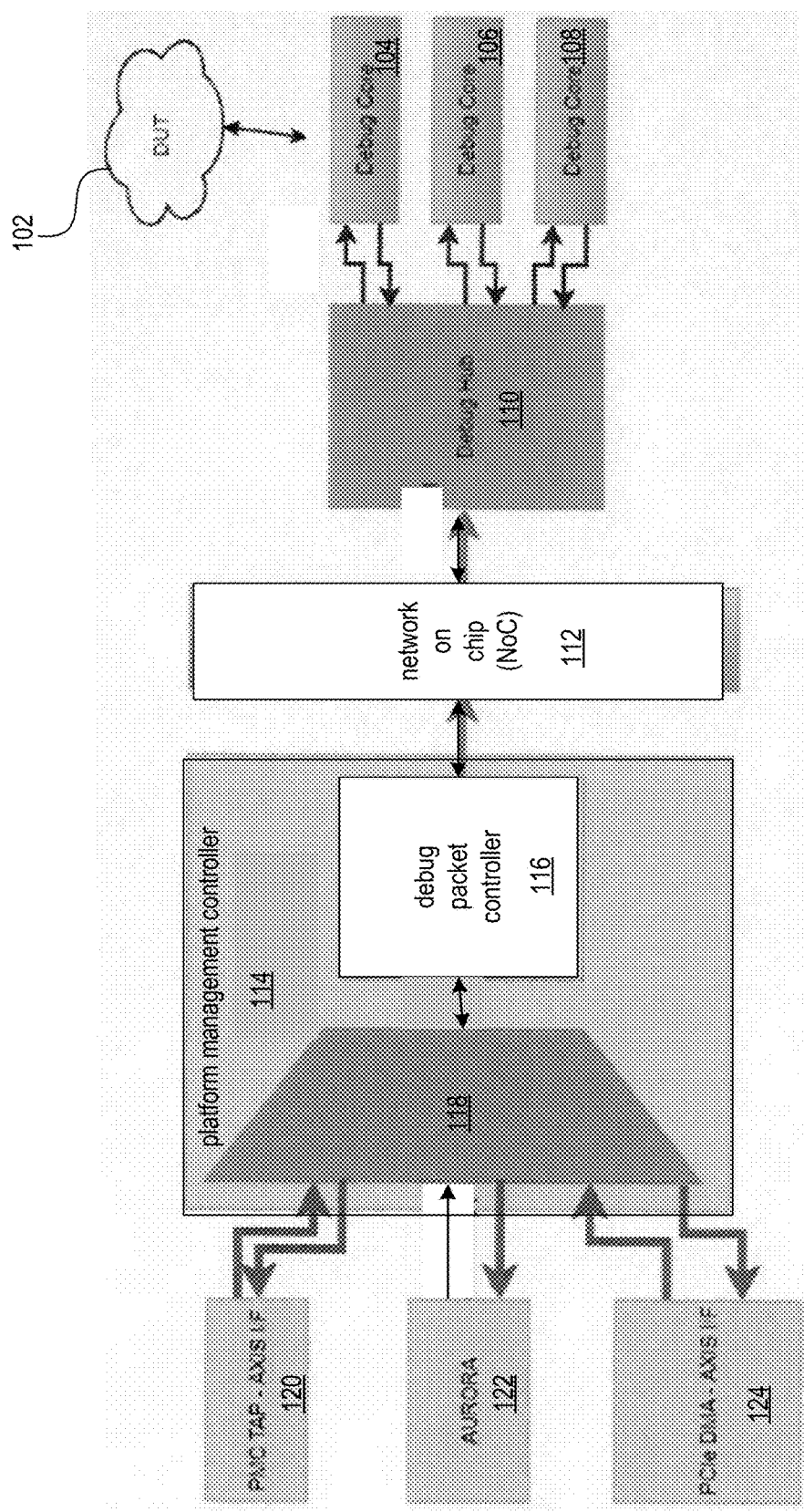
FIG. 1 shows circuitry used in debugging a device under test (DUT)

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

In operating a circuit implemented in programmable logic, a user may discover an error and needs debugging circuitry to analyze operation of the circuit under test conditions. According to the disclosed methods and systems, the user can direct a design/debugging tool to automatically determine the circuitry and interfaces needed for debugging but absent from the circuit design. The tool can also automatically instantiate and stitch the identified circuitry and interfaces to nets in the circuit design.

For example, in devices such as adaptive compute acceleration platforms from Xilinx, Inc., a design tool can identify and instantiate cores, such the CIPS core (Control, Interface & Processing System), AXI NOC (network-on-chip), Debug Hub, and ILA(s) (integrated logic analyzer(s)), perform stitching of AXI-based (both memory map and streaming) interfaces, reconfigure already-present debug interface control circuit, and instantiate AXI NOC and AXI SmartConnect interfaces.

In addition to identification and instantiating needed circuits and interfaces, the disclosed methods and system support a re-entrant design flow that allows a designer to easily modify the newly inserted circuits and interfaces at the post synthesis design level. In a re-entrant design flow, a user can manually or automatically add debug circuits and interfaces to a design, synthesize the debug circuits, and then test the circuit. The user can later decide to connect the previously instantiated debug circuits and interfaces to additional net(s) of the target circuit design. The user can specify the net(s) to be newly connected to the debug circuitry and then rerun synthesis on the debug circuitry in order to stitch the additional selected net(s) to the debug circuitry.

The disclosed methods and system support debugging of reconfigurable partitions of programmable logic for dynamic function exchange (DFX) through persistence of inserted debug circuits and interfaces. A separate debug constraint file is created to provide persistence of debug circuitry and interfaces. The separate debug constraint file allows a user to easily remove the debug circuitry from the circuit design, and later reestablish the debug circuitry in the circuit design without having to repeat the process of selecting debug cores and which nets to connect.

FIG. 1 shows circuitry used in debugging a device under test (DUT). The DUT 102 is a circuit implemented from a circuit design in programmable logic circuitry of a system-on-chip (SoC), for example. Programmable logic circuitry can include circuits of a field programmable gate array.

Selected signals of the DUT can be probed through debug cores 104, 106, and 108. The debug hub 110 is an embedded logic core that connects to a host to present debug and trace data over AXI4-MM interface through a NoC. A "host" is a computer processor that executes a design/debugging tool. The debug cores are connected to the debug hub over light-weight AXI4-Stream interfaces. The debug cores and debug hub are circuits implemented in programmable logic circuitry from logic cores, such as those available in libraries of logic cores provided to designers by makers of devices and circuit designs.

The SoC can include a network-on-chip (NoC) 112 through which signals gathered and routed by the debug hub can accessed. The NoC also provides communication between other components (not shown) of the SoC.

The platform management controller 114 provides functions for secure booting and configuring the SoC, monitoring and integrity checking the SoC, and debugging access. Debugging functions of the platform management controller are supported by the debug packet controller 116. The debug packet controller receives streaming debug packets, such as those issued from a debugger system, and buffers debug or trace data to be returned to the debugger system. The debug packet controller processes each debug packet in the input buffers by decoding an operation code in the debug packet and accessing debug data based on an address in the debug packet. The debug packet controller can be coupled to the NoC for communicating with the debug hub 110.

The SoC has multiple, different channels available to control debugging activities and gather debug data. The exemplary channels include a channel 120 that provides a TAP-AXIS (Advanced eXtensible Interface Slave) interface, a channel 122 that provides an external interface that is scalable, lightweight, link-layer protocol for high-speed serial communication, such as the Aurora 64B/66B interface from XILINX, Inc., and a channel 124 that provides a PCIe (peripheral component interconnect express) DMA (direct memory access)-AXIS interface. Multiplexing circuitry 118 of the platform management controller routes data between the different channels and the debug packet controller.

Figure 2:
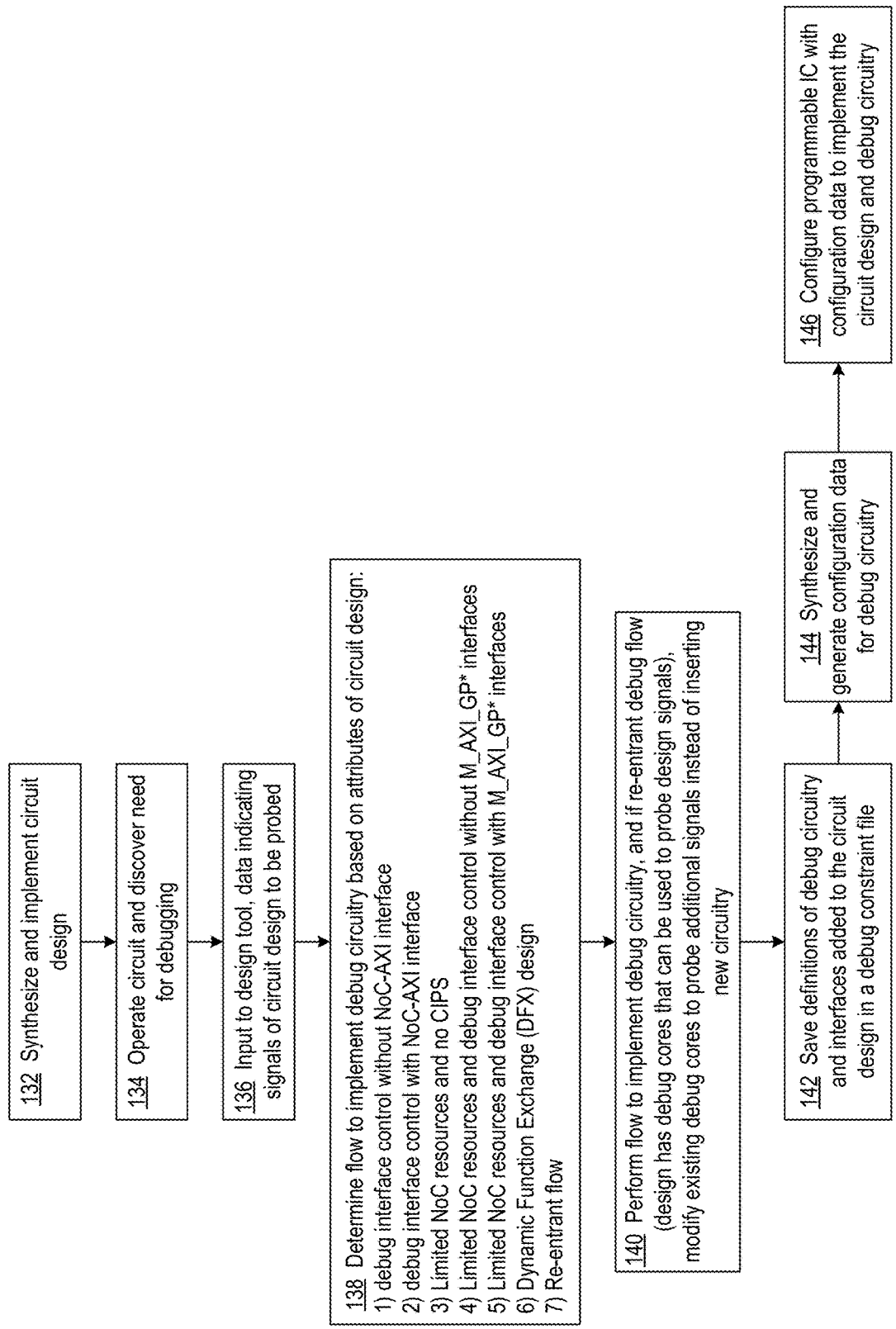
FIG. 2 shows a flowchart of an exemplary process of automatically integrating debug cores into a synthesized design.

FIG. 2 shows a flowchart of an exemplary process of automatically integrating debug cores into a synthesized design. At block 132, a circuit design is synthesized and implemented into an operable circuit. At block 134, the implemented circuit can be operated in a test environment or in an end-use environment. In operating the circuit, the user may discover circuit behavior that is incorrect and determine that debugging of the circuit design is required.

Once erroneous behavior is discovered, at block 136 a circuit designer can operate a circuit design/debugging tool and input data that identify one or more signals of the circuit design to be probed. The circuit designer can optionally configure how a debug core is to probe a signal, such as configuring a sample data depth and/or input pipeline stages.

At block 138, the tool automatically determines circuits and interfaces needed to support debugging and not present in the circuit design. Specifically, the circuit design may have some circuits needed to support debugging but lack other circuits needed for debugging. According to an exemplary approach, the design tool can identify one of a number of different combinations of circuits and interfaces the circuit design has and needs to support debugging.

According to one combination, the circuit design has a debug interface control and does not have a NoC-AXI interface. The combination can be determined by scanning the circuit design to determine that the debug interface control does not have a NoC-AXI interface enabled.

According to another combination, the circuit design has a debug interface control and has a NoC-AXI interface. The combination can be determined by scanning the circuit design to determine that the debug interface control has a NoC-AXI interface enabled.

According to another combination, the circuit design has limited NoC resources and no debug interface control. The combination can be determined by reading NoC specifications of the target programmable IC scanning the circuit design to determine the number of NoC ports and scanning the circuit design to determine the number of NoC ports used by the circuit design. If the number of available NoC ports is less than a threshold number, the circuit design can be considered to have limited NoC resources. The absence of a debug interface control can be determined by scanning the circuit design.

According to another combination, the circuit design has limited NoC resources and debug interface control without M_AXI_GP* interfaces. A M_AXI_GP* interface is an interface available on the debug interface control for connecting to AXI based programmable logic circuits. The limited availability of NoC resources and presence of the debug interface control can be determined as described above. The tool can read the configuration of the debug interface control to determine that a M_AXI_GP* interface has not been configured.

According to another combination, the circuit design has limited NoC resources and the debug interface control has M_AXI_GP* interfaces. The limited availability of NoC resources and presence of the debug interface control can be determined as described above. The tool can read the configuration of the debug interface control to determine that a M_AXI_GP* interface has been configured.

According to another combination, the circuit design employs DFX. A DFX circuit design has a static portion and dynamic portion. DFX provides the ability to dynamically modify blocks of logic by downloading partial bit files while the remaining logic continues to operate without interruption. DFX supports changing the functionality of the dynamic portions on-the-fly and eliminates the need to fully reconfigure and re-establish links. A DFX circuit design can be identified by scanning the design for multiple reconfigurable modules that have exactly the same interface.

In a re-entrant debug flow, the circuit design has existing debug cores and supporting circuits for probing other signals of the circuit design. Instead of inserting new debug cores and supporting interface cores, the re-entrant flow modifies debug cores that are already present in circuit design to probe the signals identified at block 136.

Based on the attributes of the circuit design, the tool selects a design flow to perform to supplement the circuit design with any required circuits or interfaces. At block 140, the design tool performs the flow according to the debug cores and interfaces needed to support debugging as identified in block 108. In performing the selected flow, the tool creates the debug cores and interfaces needed for debugging in the circuit design. The selected flow also stitches the debugging circuitry to the exiting interfaces and signals to be probed by coupling and configuring the debug cores and interfaces to the signals in the synthesized circuit design. If a re-entrant flow was identified, the existing debug cores are modified to probe the signals specified at block 136, and no additional debugging circuitry or interfaces need to be added to the circuit design.

At block 142, the design tool saves definitions of the debug cores and interfaces, which were added to the circuit design at block 108, in a debug constraint file. Saving the definitions of the inserted debug circuitry in a debug constraint file can be useful to aid in debugging nets within a reconfigurable partition of a DFX flow. Because different reconfigurable modules can have their own distinct logic, the signals in one reconfigurable module may not be available to probe in other reconfigurable module. A separate debug constraint file is created for each reconfigurable module, and the debug constraint file specifies the signals to probe, along with definitions of debug circuitry and interfaces added to the DFX module.

At block 144, the debug cores and interface added to the circuit design are synthesized, without resynthesizing the target circuit design, and configuration data is generated to implement the circuitry and interfaces. For example, place-and-route and bitstream generation tools may be executed to generate a circuit definition, such as configuration data for programmable circuitry, data for generating an application-specific integrated circuit, or a simulation model. At block 146, a circuit can be implemented by way of configuring a programmable IC with the configuration data, making an ASIC, or generating a simulation model to specifically program a processor, thereby creating a circuit that operates according to the circuit design supplemented with the debug cores.

FIG. 3 shows a flowchart of a process that adds circuitry and interfaces to a circuit design that has a debug interface control circuit but does not have a NoC-AXI interface to the debug interface control circuit. Generally, the tool inserts an LNoC and connects the LNoC to the Noc-AXI interface of the debug interface control circuit. At block 152, the design tool instantiates debug cores, which can include a debug hub core and integrated logic analyzers (ILAs), and a logical NoC (LNoC) block in the circuit design. The debug hub core, ILAs, and LNoC block can be obtained from a library of logic cores provided by a device vendor or design vendor. An LNoC block is a design component that can be instantiated in a design and can communicatively couple other components of the design. Rather than presenting the NoC of the target device to the designer as a monolithic component, the design tool allows a designer to specify individual LNoCs for coupling components. Each LNoC can specify a subset of paths through the NoC of the target device, instead of having all NoC paths going through a single monolithic NoC component.

At block 154, the design tool connects the debug cores to the designer-specified signals of the circuit design. At block 156, the design tool configures the LNoC to enable address and data bus interfaces to the NoC. At block 158, the design tool connects the NoC to the debug interface control circuit by configuring the LNoC block, and at block 160, the design tool connects the clock of the programmable logic and reset signals to the debug hub core.

FIG. 4 shows a flowchart of a process that adds circuitry and interfaces to a circuit design that has a debug interface control circuit and a NoC-AXI interface to the debug interface control circuit. Generally, if a NoC-AXI interface is already in use, the tool inserts an LNoC and connects the LNoC to an existing LNoC via the available LNoC interface.

At block 202, the design tool instantiates debug cores, which can include a debug hub core and integrated logic analyzers (ILAs) as described above, in the circuit design. At block 204, the design tool connects the debug cores to the designer-specified signals of the circuit design. At block 206, the design tool instantiates an LNoC as a NoC slave unit (NSU) in the circuit design, and at block 208, the design tool assigns a destination identifier to the NSU in order to connect the existing LNoC, which is a NoC master unit (NMU) connected to the debug interface control, to the NSU. The NMU is an internal primitive of an LNoC for connecting to other AXI4-based master interface of a design component, such as to the NoC-AXI interface of debug interface control. The NSU is an internal primitive of an LNoC for connecting to AXI4 based slaves, such as the AXI4 interface of the debug hub.

At block 210, the design tool invokes the NoC compiler to generate a NoC configuration for connecting the NMU to the NSU. The compilation of the newly specified connection does not affect the NoC connections of the circuit design. At block 212, the design tool connects the fabric clock and reset signals to the debug hub core.

Figure 5:
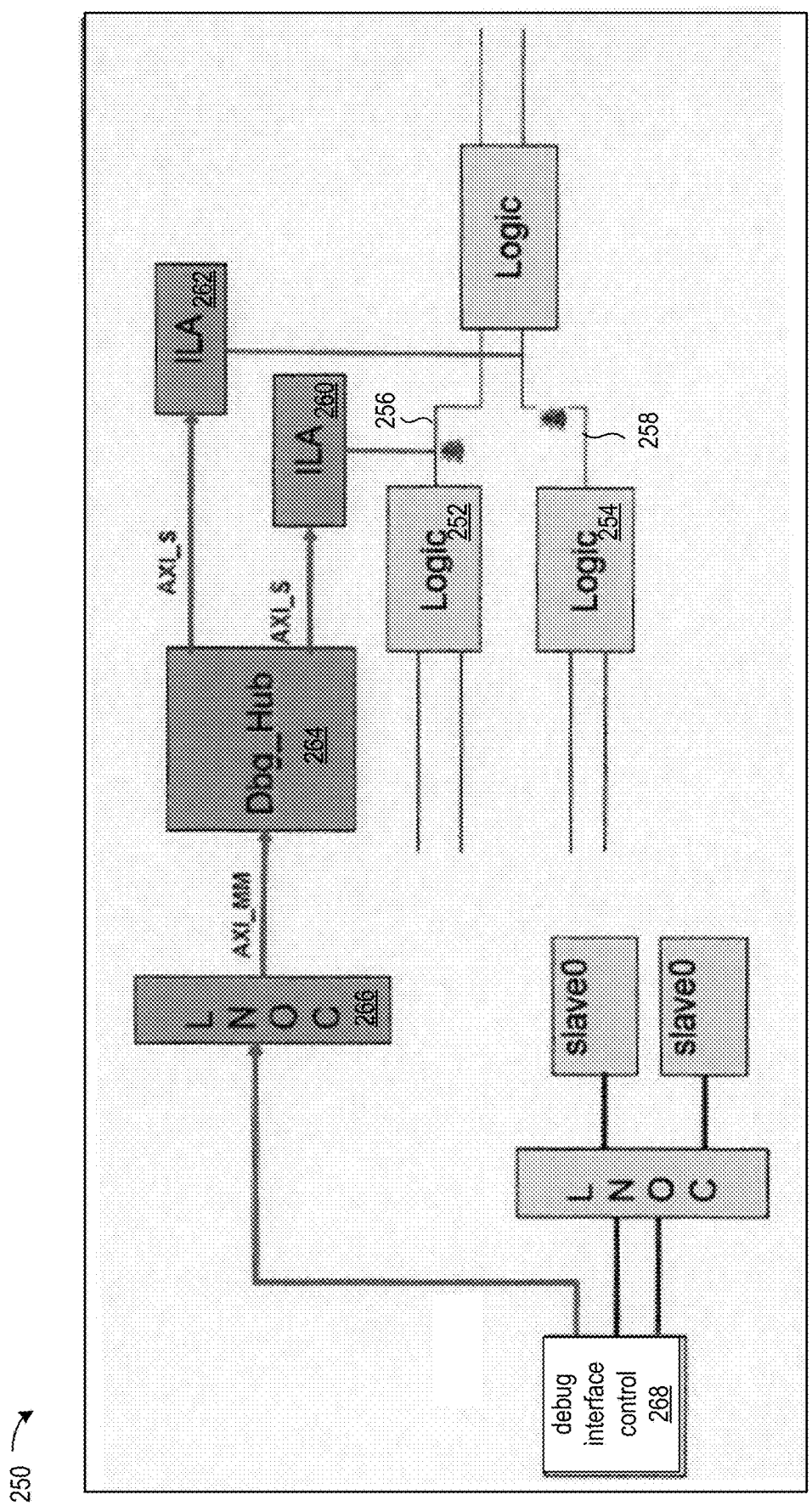
FIG. 5 shows an exemplary circuit design having circuitry and interfaces added to initial circuit designs according to the process shown in FIG. 3.

FIG. 5 shows an exemplary circuit design 250 having circuitry and interfaces added to initial circuit designs according to the process shown in FIG. 3. The logic circuits 252 and 254 produce the signals to be probed on lines 256 and 258. The inserted debug cores include the ILAs 260 and 262 and debug hub 264. The debug interface control 268 is inserted to connect the debug circuitry to the platform management controller (FIG. 1), and the LNoC block 266 is inserted for communicatively coupling the debug interface control to the debug hub.

The LNoC is configured to provide an address and data bus interface (e.g., an AXI interface) between the debug interface control 268 and the debug hub 264. In an exemplary configuration, the interface between the LNoC and the debug hub can be memory mapped (e.g., AXI_MM), and the interface between the debug hub and the ILAs 260 and 262 can be streaming (AXI_S).

Figure 6:
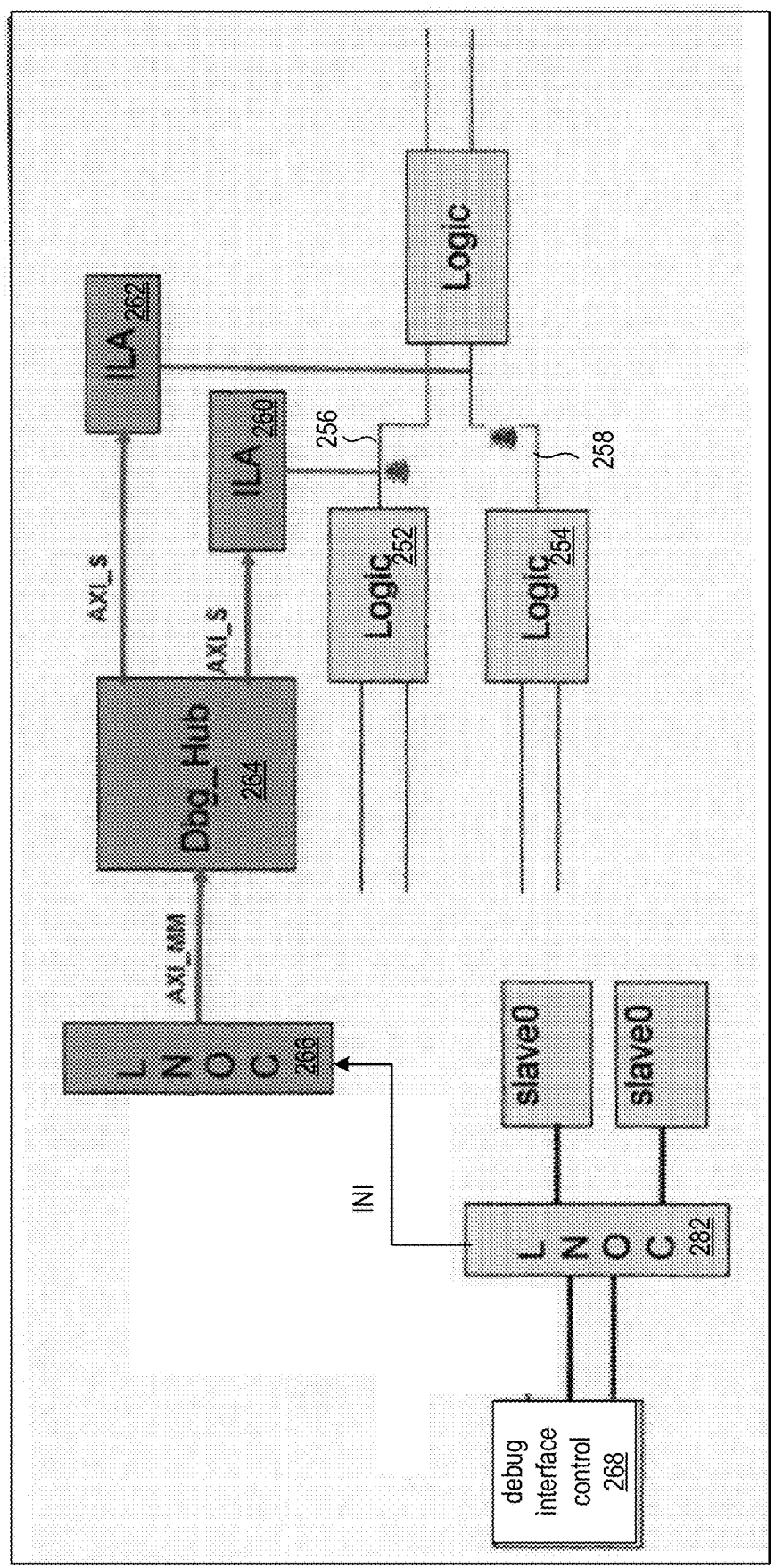
FIG. 6 shows an exemplary circuit design having circuitry and interfaces added to initial circuit designs according to the process shown in FIG. 4.

FIG. 6 shows an exemplary circuit design 280 having circuitry and interfaces added to initial circuit designs according to the process shown in FIG. 4. The logic circuits 252 and 254 produce the signals to be probed on lines 256 and 258. The inserted debug cores include the ILAs 260 and 262 and debug hub 264. The debug interface control 268 is inserted to connect the debug circuitry to the platform management controller (FIG. 1), and the LNoC block 266 is inserted for communicatively coupling the debug interface control to the debug hub.

The LNoC 282, which is part of the original circuit design, and LNoC 266 are configured to provide an address and data bus interface (e.g., an AXI interface) between the debug interface control 268 and the debug hub 264. In an exemplary configuration, the interface between the LNoC 266 and the debug hub 264 can be memory mapped (e.g., AXI_MM), and the interface between the debug hub and the ILAs 260 and 262 can be streaming (AXI_S). The "INI" interface between LNoC 282 and 266, which is automatically established by the tool in the process of FIG. 4, is the inter-LNoC interface that can be used to connect two LNoC instances.

Figure 7:
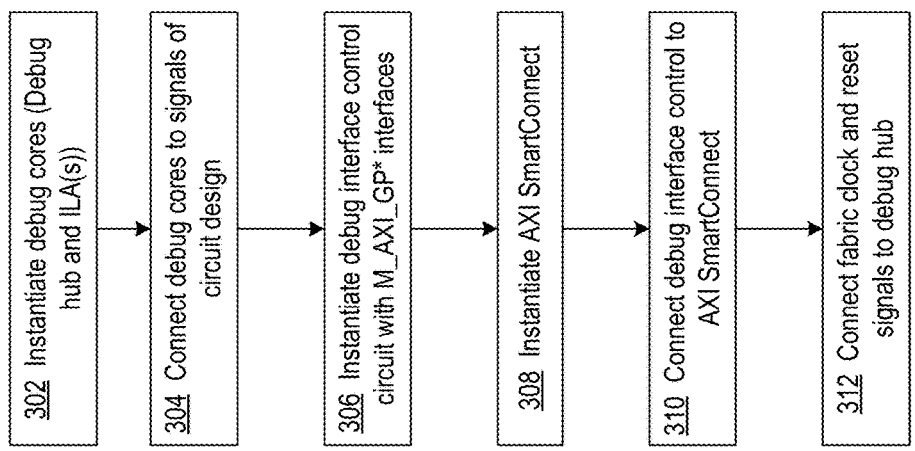
FIG. 7 shows a flowchart of a process that adds circuitry and interfaces to a circuit design that has limited NoC resources and does not have a debug interface control circuit.

FIG. 7 shows a flowchart of a process that adds circuitry and interfaces to a circuit design that has limited NoC resources and does not have a debug interface control circuit. If the number of available ports of the NoC on the target programmable IC is less than a threshold, the tool inserts circuitry that uses SmartConnect in order to avoid using any NoC resources.

At block 302, the design tool instantiates a debug hub core and ILAs in the circuit design. At block 304, the design tool connects the debug cores to the user-specified signals of the circuit design.

At block 306, the design tool instantiates a debug interface control circuit with M_AXI_GP* interfaces, and at block 308 the design tool instantiates an "AXI SmartConnect" core in the circuit design. The AXI SmartConnect core is configurable to connect one or more AXI memory-mapped master devices to one or more memory-mapped slave devices. The AXI SmartConnect core is a hierarchical logic core that is available in a core library and can automatically configure and adapt to connected AXI master and slave logic with minimal user intervention.

At block 310, the tool connects the debug interface control circuit to the AXI SmartConnect core, and at block 312, connects the fabric clock and reset signals to the debug hub core.

Figure 8:
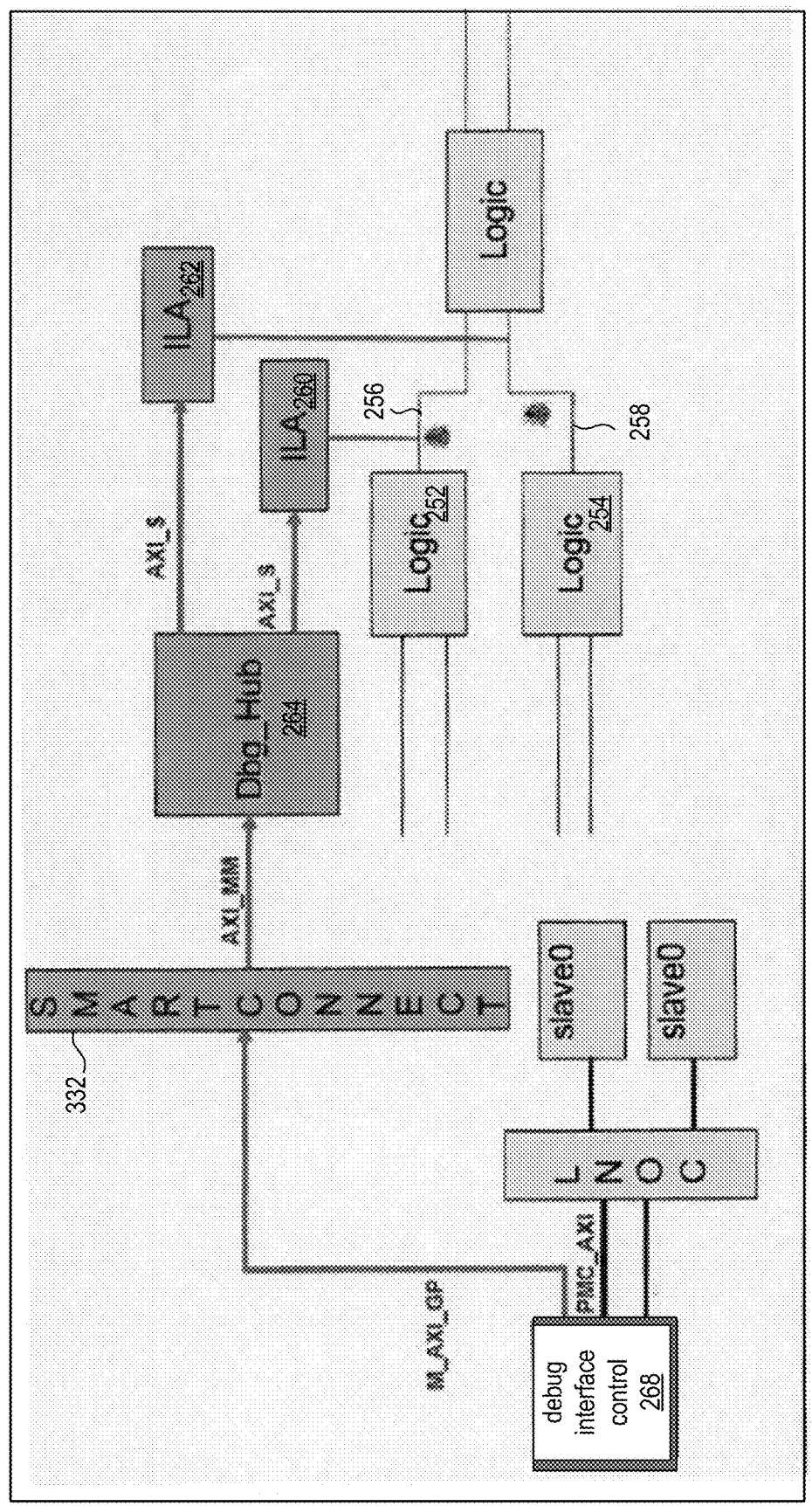
FIG. 8 shows an exemplary circuit design having circuitry and interfaces added to an initial circuit design according to the process shown in FIG. 7.

FIG. 8 shows an exemplary circuit design 330 having circuitry and interfaces added to an initial circuit design according to the process shown in FIG. 7. The logic circuits 252 and 254 produce the signals to be probed on lines 256 and 258. The inserted debug cores include the ILAs 260 and 262 and debug hub 264. The debug interface control 268 is inserted to connect the debug circuitry to the platform management controller (FIG. 1), and the SmartConnect core 332 is inserted for communicatively coupling the debug interface control to the debug hub.

The debug interface control is configured to provide the M_AXI_GP* interface to the SmartConnect core 332, and the SmartConnect core is configured to provide an address and data bus interface (e.g., an AXI interface) between the debug interface control 268 and the debug hub 264. In an exemplary configuration, the interface between the LNoC and the debug hub can be memory mapped (e.g., AXI_MM), and the interface between the debug hub and the ILAs 260 and 262 can be streaming (AXI_S).

Figure 9:
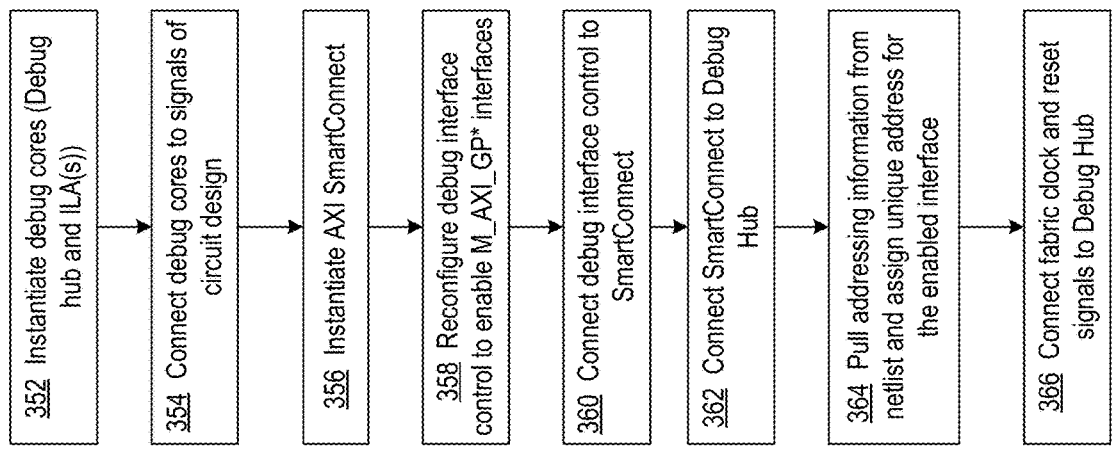
FIG. 9 shows a flowchart of a process that adds circuitry and interfaces to a circuit design that has limited NOC resources, has a debug interface control circuit, but does not have M_AXI_GP* interfaces.

FIG. 9 shows a flowchart of a process that adds circuitry and interfaces to a circuit design that has limited NoC resources, has a debug interface control circuit, but does not have M_AXI_GP* interfaces. At block 352, the design tool instantiates a debug hub core and ILAs in the circuit design. At block 354, the design tool connects the debug cores to the user-specified signals of the circuit design.

At block 356, the design tool instantiates an AXI SmartConnect core in the circuit design and at block 358 the design tool reconfigures the debug interface control circuit to enable M_AXI_GP* interfaces. At block 360, the design tool connects the debug interface control circuit to the AXI SmartConnect core, at block 362, the design tool connects the AXI SmartConnect core to the debug hub.

At block 364, the design tool pulls addressing information from the netlist and assigns a unique address for the enabled interface. Each logic core that uses an AXI4 interface needs an address for communication on the interface. The debug hub also uses AXI4 interface and its addressing information (base address and range) is used by the debug tool to communicate to debug cores via debug hub.

At block 366, the design tool connects the fabric clock and reset signals to the debug hub.

Figure 10:
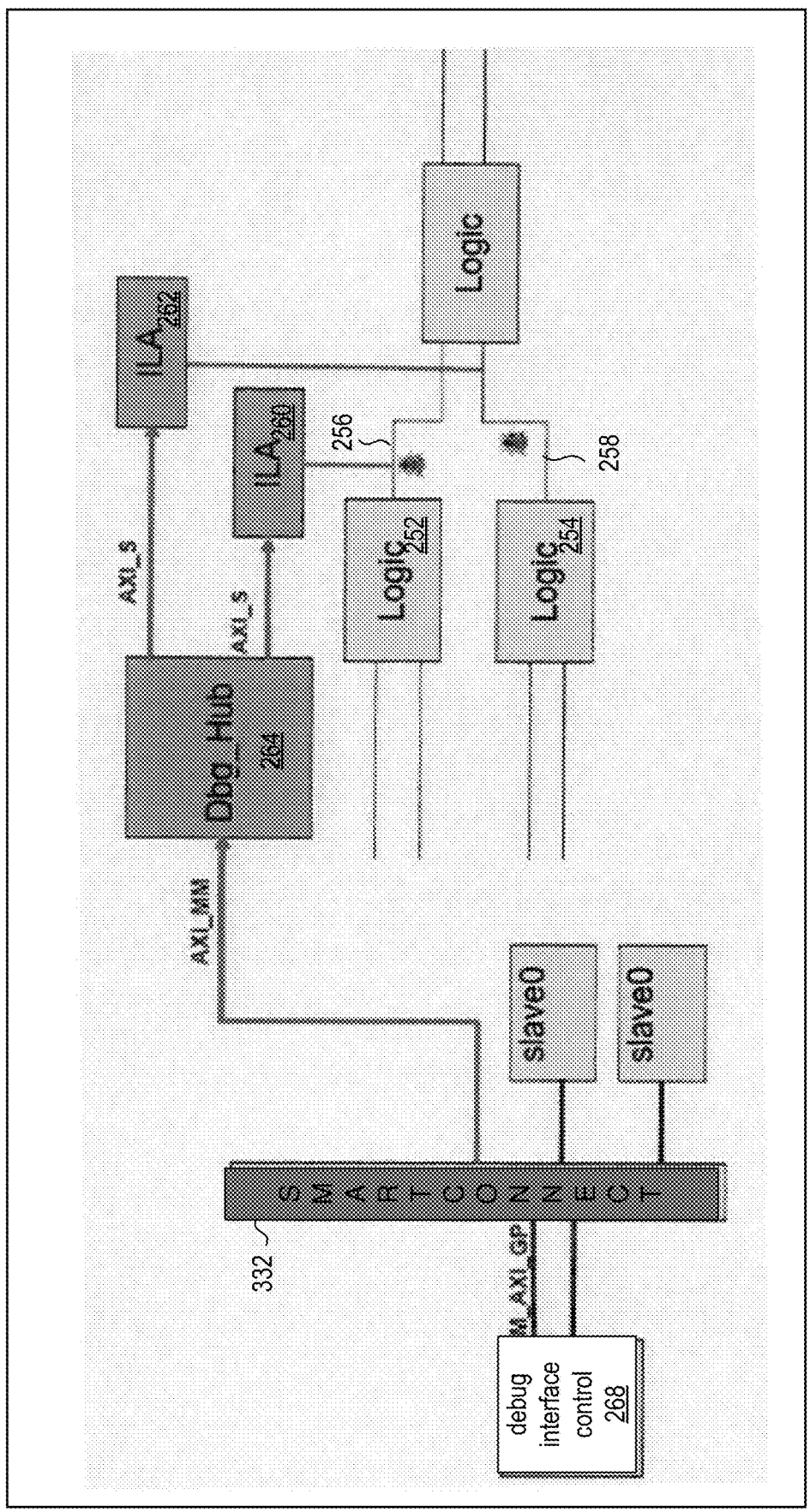
FIG. 10 shows an exemplary circuit design 380 having circuitry and interfaces added to an initial circuit design processed according to the flowchart shown in FIG. 9.

FIG. 10 shows an exemplary circuit design 380 having circuitry and interfaces added to an initial circuit design processed according to the flowchart shown in FIG. 9. The logic circuits 252 and 254 produce the signals to be probed on lines 256 and 258. The inserted debug cores include the ILAs 260 and 262 and debug hub 264. The debug interface control 268 is inserted to connect the debug circuitry to the platform management controller (FIG. 1), and the SmartConnect core 332 is inserted for communicatively coupling the debug interface control to the debug hub.

The debug interface control 268 is configured to provide the M_AXI_GP* interface to the SmartConnect core 332, and the SmartConnect core is configured to provide an address and data bus interface (e.g., an AXI interface) between the debug interface control 268 and the debug hub 264. In an exemplary configuration, the interface between the LNoC and the debug hub can be memory mapped (e.g., AXI_MM), and the interface between the debug hub and the ILAs 260 and 262 can be streaming (AXI_S).

Figure 11:
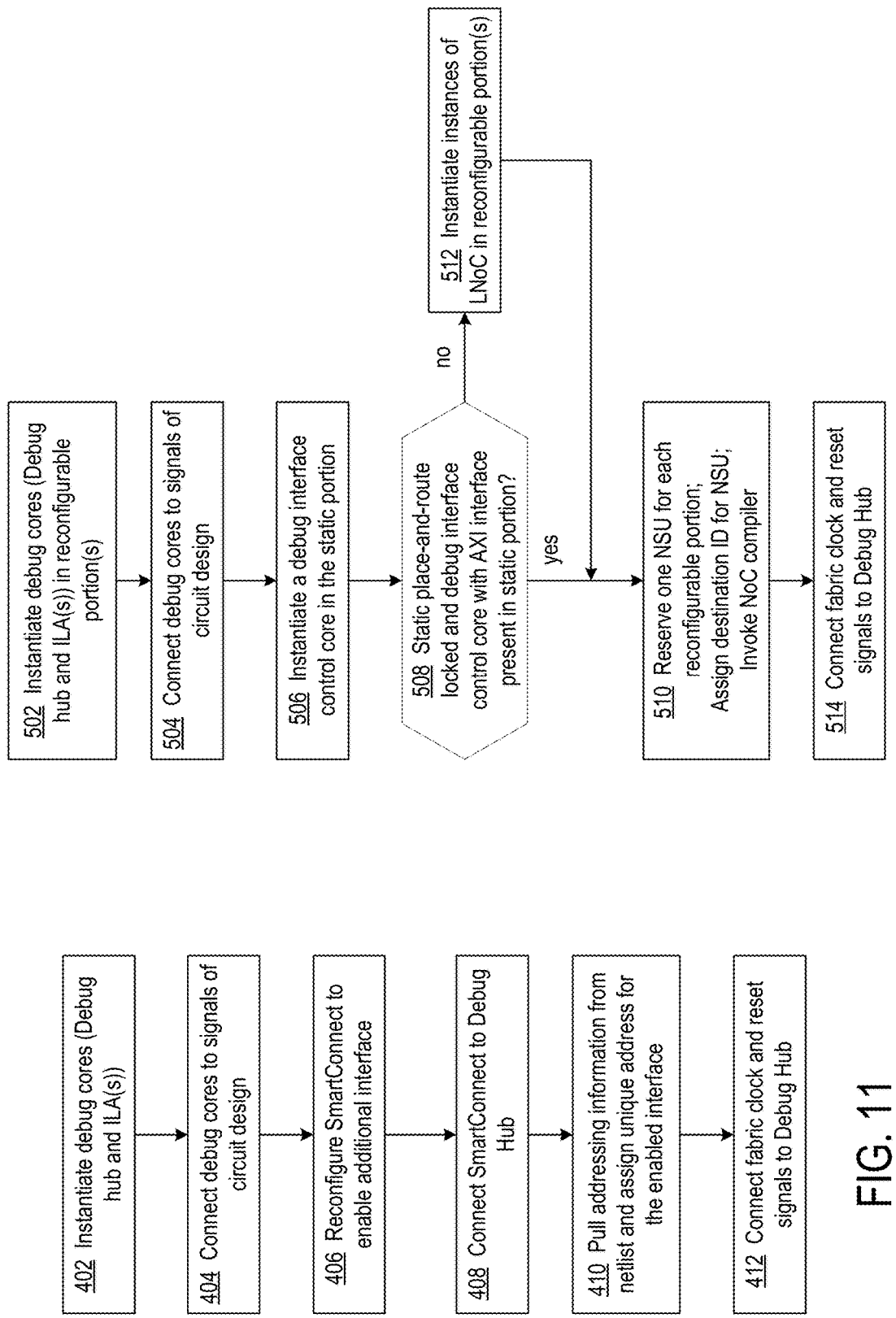
FIG. 11 shows a flowchart of a process that adds circuitry and interfaces to a circuit design that has limited NoC resources, has a debug interface control circuit, and has M_AXI_GP* interfaces coupled to a SmartConnect core.

FIG. 11 shows a flowchart of a process that adds circuitry and interfaces to a circuit design that has limited NoC resources, has a debug interface control circuit, and has M_AXI_GP* interfaces coupled to a SmartConnect core. In this debug flow, the tool reconfigures the SmartConnect interface to provide additional AXI4 slaves and connects the debug hub with newly enabled AXI4 interface(s).

At block 402, the design tool instantiates a debug hub core and ILAs in the circuit design. At block 404, the design tool connects the debug cores to the user-specified signals of the circuit design.

At block 406, the design tool reconfigures the AXI SmartConnect core to enable an additional interface to connect to the debug hub, and at block 408, the design tool connects the AXI SmartConnect core to the debug hub core.

At block 410, the design tool pulls addressing information from the netlist and assigns a unique address for the enabled interface of the SmartConnect core. At block 412, the design tool connects the fabric clock and reset signals to the debug hub core.

Figure 12:
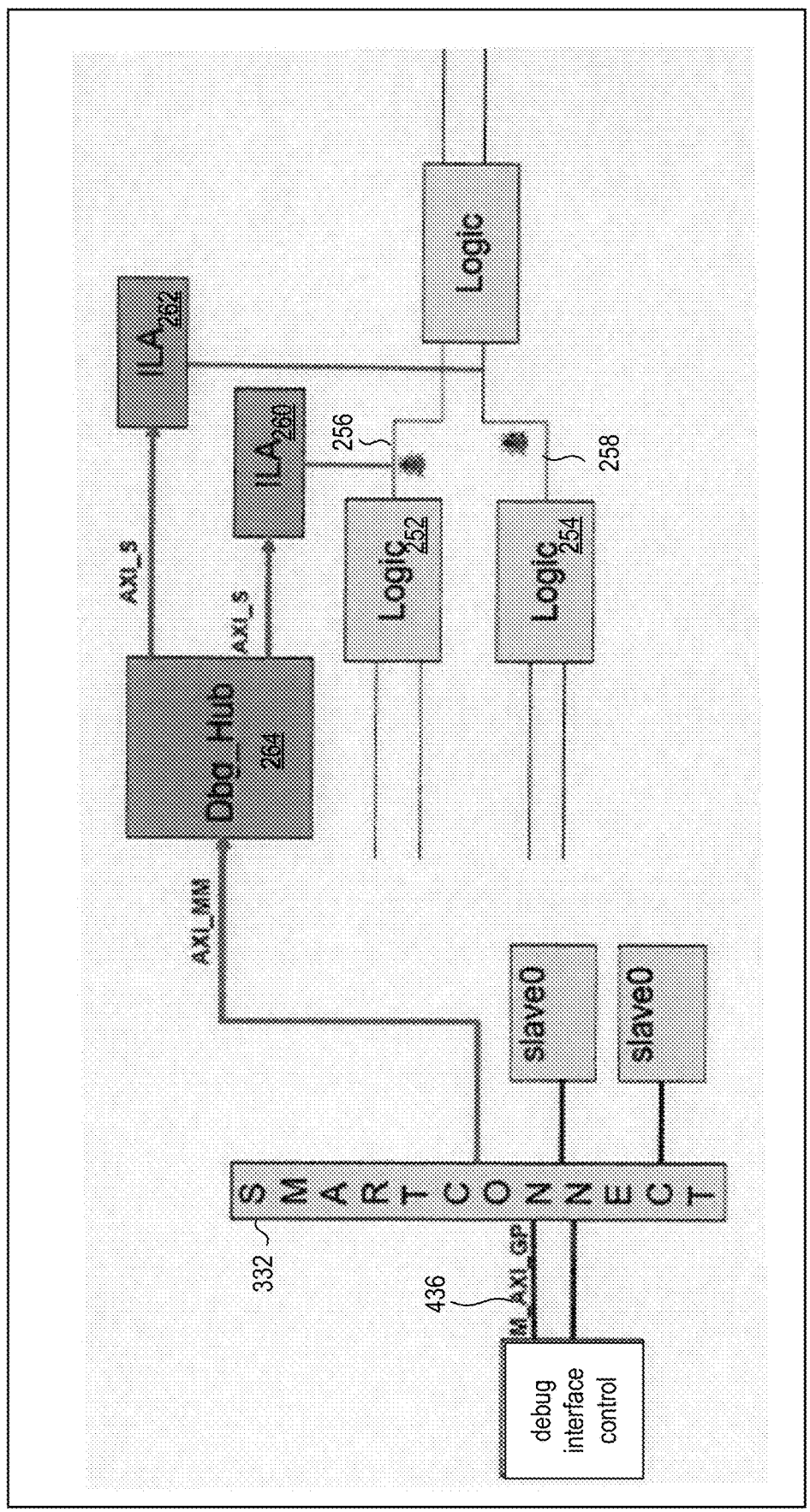
FIG. 12 shows an exemplary circuit design having circuitry and interfaces added to an initial circuit design processed according to the flowchart shown in FIG. 11.

FIG. 12 shows an exemplary circuit design having circuitry and interfaces added to an initial circuit design processed according to the flowchart shown in FIG. 11.

The logic circuits 252 and 254 produce the signals to be probed on lines 256 and 258. The inserted debug cores include the ILAs 260 and 262 and debug hub 264. The debug interface control 268 and SmartConnect core 332 were present in the original circuit design to connect slave circuits 432 and 434 to the platform management controller (FIG. 1).

The debug interface control 268 is reconfigured to provide the additional M_AXI_GP* interface 436 to the SmartConnect core 332, and the SmartConnect core is configured to provide an address and data bus interface (e.g., an AXI interface) between the debug interface control 268 and the debug hub 264. In an exemplary configuration, the interface between the LNoC and the debug hub can be memory mapped (e.g., AXI_MM), and the interface between the debug hub and the ILAs 260 and 262 can be streaming (AXI_S).

FIG. 13 shows a flowchart of a process that adds circuitry and interfaces to a circuit design that employs dynamic function exchanges (DFX). A circuit design that employs DFX has a static portion and dynamic portion. DFX provides the ability to dynamically modify blocks of logic by downloading partial bit files while the remaining logic continues to operate without interruption. DFX supports changing the functionality of the dynamic portions on-the-fly and eliminates the need to fully reconfigure and re-establish links.

At block 502, the design tool instantiates a debug cores in the reconfigurable portion(s) of the circuit design. At block 504, the design tool connects the debug cores to the user-specified signals of the circuit design. The design tool instantiates a debug interface control core in the static portion of the design at block 506.

At decision block 508, the design tool determines whether or not static place-and-route is locked and whether or not the debug interface control circuit has an AXI interface connected to an LNoC in the static region. If so, at block 510 the design tool reserves one NSU for each reconfigurable region. The tool also assigns a destination ID for each NSU and invokes the NoC compiler to generate NoC configuration data, similar to FIG. 4. The static portion of the circuit design can have place-and-route locked to prevent the static portion from changing when a reconfigurable portion is modified to accommodate debugging cores and interfaces.

If the design tool determines that static place-and-route is not locked or the debug interface control circuit does not have AXI interface connected to an LNoC in the static region, at block 512 the design tool instantiates LNoC instance(s) in the reconfigurable portion(s). The design tool continues at block 510 as described above.

The design tool connects the fabric clock signal and reset signal to the debug hub(s) at block 514.

Figure 14:
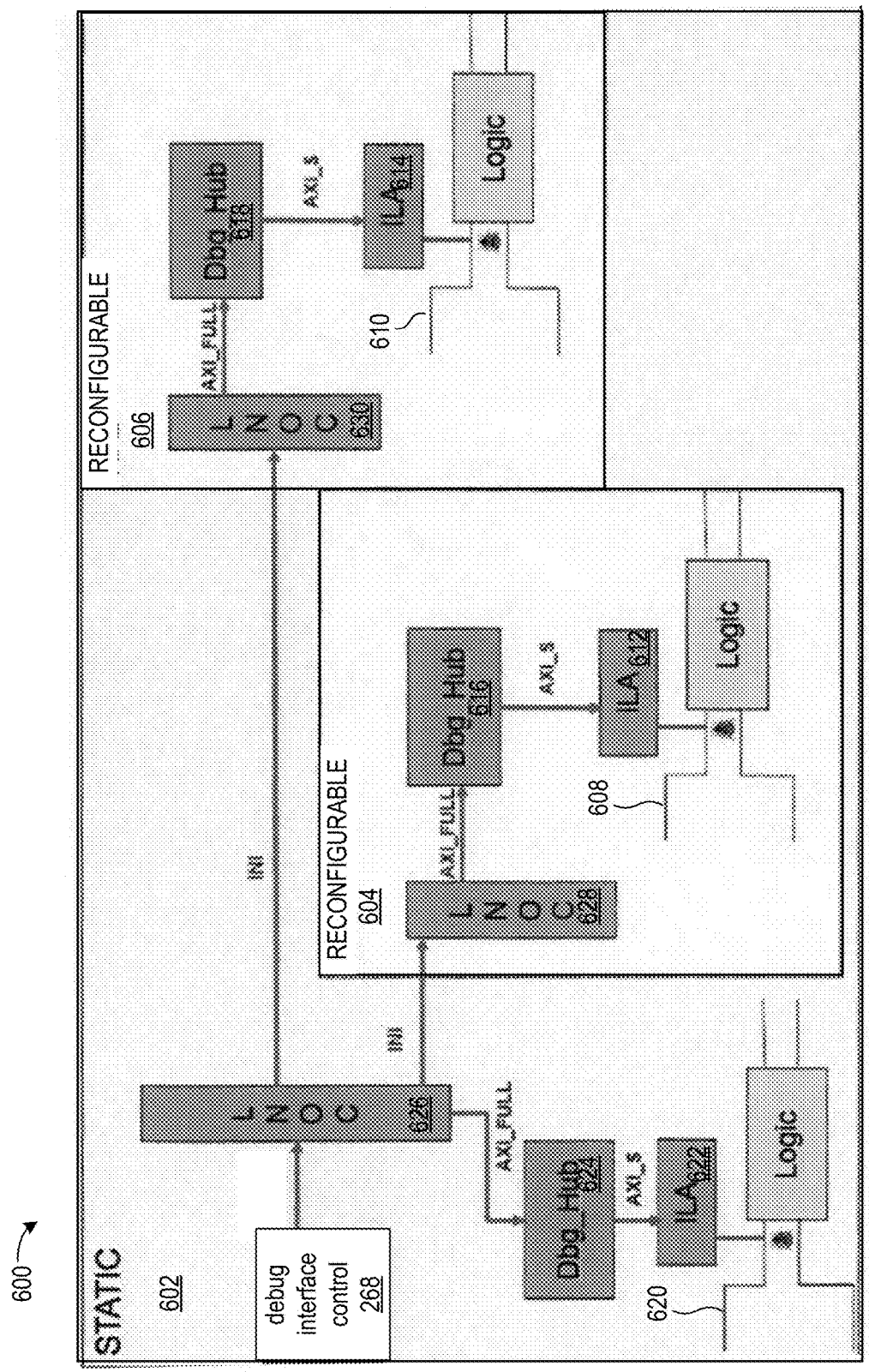
FIG. 14 shows an exemplary circuit design 600 having circuitry and interfaces added to an initial circuit design processed according to the flowchart shown in FIG. 13.

FIG. 14 shows an exemplary circuit design 600 having circuitry and interfaces added to an initial circuit design processed according to the flowchart shown in FIG. 13. The exemplary circuit design includes static portion 602 and reconfigurable portions 604 and 606.

The signals to be probed are on lines 608, 610, and 620. The inserted debug cores include the ILAs 612, 614, and 622 and debug hubs 616, 618, and 624. The debug interface control 268 is inserted to connect the debug circuitry to the platform management controller (FIG. 1), and the LNoC blocks 626, 628, and 630 are inserted for communicatively coupling the debug interface control to the debug hubs.

The LNoCs 626, 628, and 630 are configured to provide an address and data bus interface (e.g., an AXI interface) between the debug interface control 268 and the debug hubs 616, 618, and 624. In an exemplary configuration, the interfaces between the LNoC 626, 628, and 630 the debug hubs 624, 616, and 618 can be AXI_FULL. "AXI_FULL" can refer to "AXI4" and "AXI-MM." "INI" is the inter-LNoC interface that can be used to connect two LNoC instances.

The interfaces between the debug hubs and the ILAs 622, 612, and 614 can be streaming (AXI_S).

Figure 15:
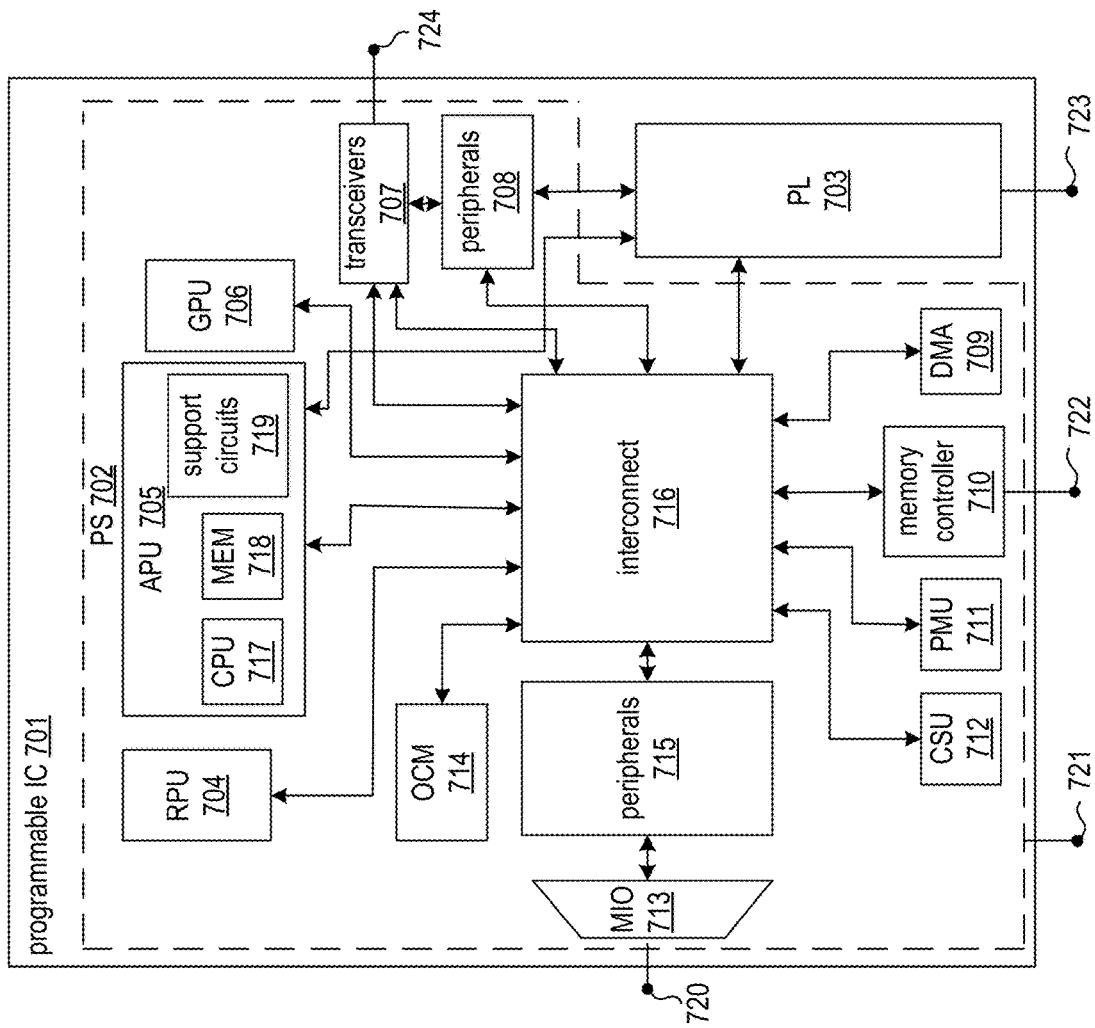
FIG. 15 is a block diagram depicting a System-on-Chip (SoC) that can host the virtual flash circuitry according to an example.

FIG. 15 is a block diagram depicting a System-on-Chip (SoC) 701 that can host the virtual flash circuitry according to an example. In the example, the SoC includes the processing subsystem (PS) 702 and the programmable logic subsystem 703. The processing subsystem 702 includes various processing units, such as a real-time processing unit (RPU) 704, an application processing unit (APU) 705, a graphics processing unit (GPU) 706, a configuration and security unit (CSU) 712, and a platform management unit (PMU) 711. The PS 702 also includes various support circuits, such as on-chip memory (OCM) 714, transceivers 707, peripherals 708, interconnect 716, DMA circuit 709, memory controller 710, peripherals 715, and multiplexed (MIO) circuit 713. The processing units and the support circuits are interconnected by the interconnect 716. The PL subsystem 703 is also coupled to the interconnect 716. The transceivers 707 are coupled to external pins 724. The PL 703 is coupled to external pins 723. The memory controller 710 is coupled to external pins 722. The MIO 713 is coupled to external pins 720. The PS 702 is generally coupled to external pins 721. The APU 705 can include a CPU 717, memory 718, and support circuits 719. The APU 705 can include other circuitry, including L1 and L2 caches and the like. The RPU 704 can include additional circuitry, such as L1 caches and the like. The interconnect 716 can include cache-coherent interconnect or the like.

Referring to the PS 702, each of the processing units includes one or more central processing units (CPUs) and associated circuits, such as memories, interrupt controllers, direct memory access (DMA) controllers, memory management units (MMUs), floating point units (FPUs), and the like. The interconnect 716 includes various switches, busses, communication links, and the like configured to interconnect the processing units, as well as interconnect the other components in the PS 702 to the processing units.

The OCM 714 includes one or more RAM modules, which can be distributed throughout the PS 702. For example, the OCM 714 can include battery backed RAM (BBRAM), tightly coupled memory (TCM), and the like. The memory controller 710 can include a DRAM interface for accessing external DRAM. The peripherals 708, 715 can include one or more components that provide an interface to the PS 702. For example, the peripherals can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose (GPIO) ports, serial advanced technology attachment (SATA) ports, PCIe ports, and the like. The peripherals 715 can be coupled to the MIO 713. The peripherals 708 can be coupled to the transceivers 707. The transceivers 707 can include serializer/deserializer (SERDES) circuits, MGTs, and the like.

Figure 16:
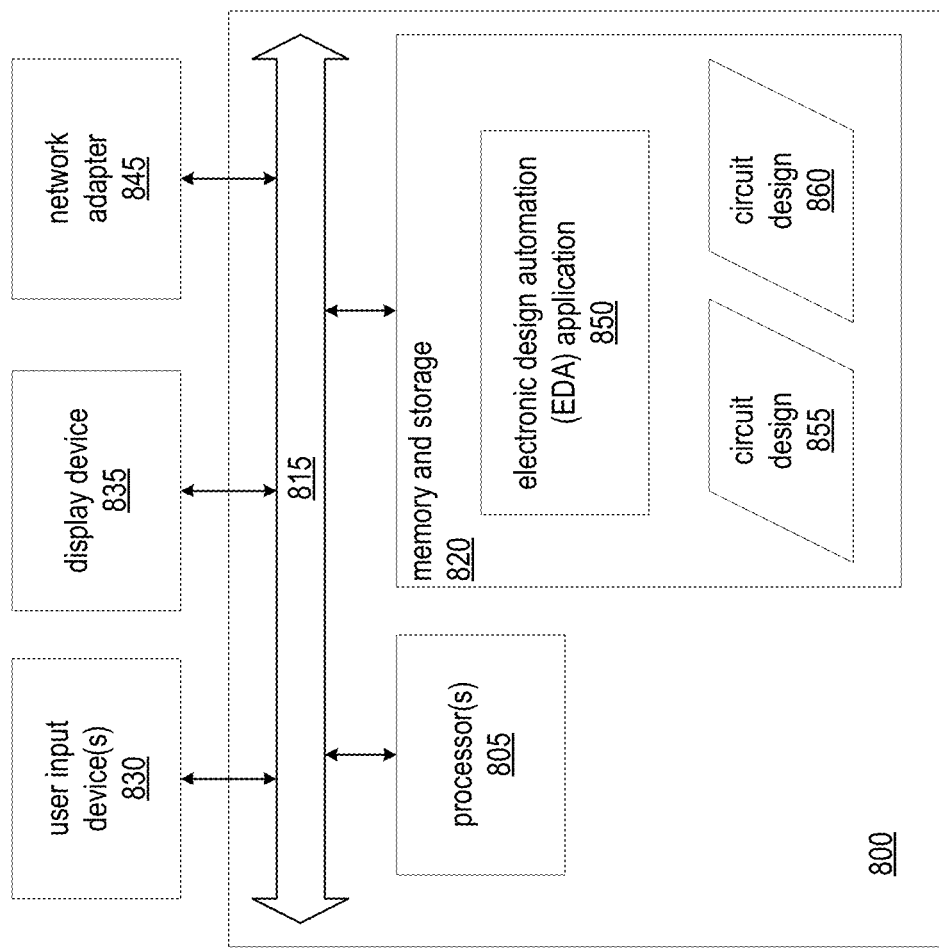
FIG. 16 is a block diagram illustrating an exemplary data processing system.

FIG. 16 is a block diagram illustrating an exemplary data processing system (system) 800. System 800 is an example of an EDA system. As pictured, system 800 includes at least one processor circuit (or "processor"), e.g., a central processing unit (CPU) 805 coupled to memory and storage arrangement 820 through a system bus 815 or other suitable circuitry. System 800 stores program code and circuit design 100 within memory and storage arrangement 820. Processor 805 executes the program code accessed from the memory and storage arrangement 820 via system bus 815. In one aspect, system 800 is implemented as a computer or other data processing system that is suitable for storing and/or executing program code. It should be appreciated, however, that system 800 can be implemented in the form of any system including a processor and memory that is capable of performing the functions described within this disclosure.

Memory and storage arrangement 820 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 800 may also include one or more cache memories (not shown) that provide temporary storage of at least some program code and data in order to reduce the number of times program code and data must be retrieved from local memory and persistent storage during execution.

Input/output (I/O) devices such as user input device(s) 830 and a display device 835 may be optionally coupled to system 800. The I/O devices may be coupled to system 800 either directly or through intervening I/O controllers. A network adapter 845 also can be coupled to system 800 in order to couple system 800 to other systems, computer systems, remote printers, and/or remote storage devices through intervening private or public networks. Modems, cable modems, Ethernet cards, and wireless transceivers are examples of different types of network adapter 845 that can be used with system 800.

Memory and storage arrangement 820 can store an EDA application 850. EDA application 850, being implemented in the form of executable program code, is executed by processor(s) 805. As such, EDA application 850 is considered part of system 800. System 800, while executing EDA application 850, receives and operates on circuit design 100. In one aspect, system 800 performs a design flow on circuit design 855, and the design flow may include synthesis, mapping, placement, routing, and the automatic insertion of debug circuitry and interfaces as described herein. System 800 generates modified version of circuit design 855 as circuit design 860.

EDA application 850, circuit design 855, circuit design 860, and any data items used, generated, and/or operated upon by EDA application 850 are functional data structures that impart functionality when employed as part of system 800 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for debugging circuit designs. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method comprising:
   inputting to a programmed processor, data that identify signals of a synthesized circuit design to be probed;
   determining by the programmed processor, whether or not debug cores and interfaces needed to probe the signals are absent from the circuit design, wherein the interfaces include interfaces to a network-on-chip (NoC);
   creating, in response to determining that the debug cores and interfaces are absent, the debug cores and interfaces in the circuit design by the programmed processor;
   coupling the debug cores and interfaces through the NoC to the signals in the circuit design;
   synthesizing the debug cores and interfaces created in the circuit design to create a modified circuit design;
   generating a circuit definition from the modified circuit design; and
   implementing a circuit that operates according to the circuit definition.

2. The method of claim 1, further comprising bypassing the creating in response to determining that the debug cores and interfaces are present in the circuit design.

3. The method of claim 1, wherein:
   the determining includes determining that the circuit design lacks an interface between a debug interface control circuit and an address and data bus through the NoC;
   the coupling includes:
     enabling an address and data bus between the debug cores and the NoC, and
     coupling the NoC to the debug interface control circuit.

4. The method of claim 1, wherein:
   the determining includes determining that the circuit design has an interface between a debug interface control circuit and an address and data bus through the NoC;
   the coupling includes specifying NoC routing data between the debug interface control circuit and the debug cores; and
   the synthesizing includes compiling the NoC routing data.

5. The method of claim 1, wherein:
   the determining includes determining that the circuit design lacks a debug interface control circuit and that a number of NoC resources is less than a threshold;
   the creating includes:
     instantiating the debug interface control core,
     instantiating an address and data bus; and
   the coupling includes coupling the debug interface control core to the debug cores through the address and data bus.

6. The method of claim 1, wherein:
   the determining includes determining that the circuit design has a debug interface control core and that a number of NoC resources is less than a threshold;
   the creating includes instantiating an address and data bus; and the coupling includes coupling the debug interface control
core to the debug cores through the address and data
bus.

7. The method of claim 1, wherein:
the determining includes determining that the circuit design has a debug interface control circuit and an address and data bus, and that a number of NoC resources is less than a threshold; and
the coupling includes:
reconfiguring the address and data bus to enable an additional interface, and
coupling the debug interface control core to the debug cores through the additional interface of the address and data bus.

8. The method of claim 1, wherein:
the determining includes:
determining that the circuit design specifies first circuitry to be implemented as a static portion of programmable logic of a programmable integrated circuit, and specifies second circuitry to be implemented as a reconfigurable portion of the programmable logic of the programmable integrated circuit, and
determining that the circuit design lacks a debug interface control circuit, the signals of the circuit design to be probed include signals from the second circuitry;
the creating includes:
instantiating in the circuit design, the debug cores to be implemented as a reconfigurable portion of the programmable logic,
instantiating an address and data bus through the NoC; and
the coupling includes coupling the debug interface control core to the debug cores through the address and data bus and NoC.

9. The method of claim 8, further comprising storing definitions of the debug cores and interfaces in a constraint file.

10. The method of claim 1, further comprising coupling a clock signal and a reset signal of the circuit design to the debug cores.

11. A system comprising:
a processor arrangement;
a memory circuit coupled to the processor arrangement and configured with instructions that when executed by the processor arrangement cause the processor arrangement to perform operations including:
inputting data that identify signals of a synthesized circuit design to be probed;
determining whether or not debug cores and interfaces needed to probe the signals are absent from the circuit design, wherein the interfaces include interfaces to a network-on-chip (NoC);
creating, in response to determining that the debug cores and interfaces are absent, the debug cores and interfaces in the circuit design;
coupling the debug cores and interfaces through the NoC to the signals in the circuit design;
synthesizing the debug cores and interfaces created in the circuit design to create a modified circuit design;
generating a circuit definition from the modified circuit design; and
implementing a circuit that operates according to the circuit definition.

12. The system of claim 11, wherein the operations include bypassing the creating in response to determining that the debug cores and interfaces are present in the circuit design.

13. The system of claim 11, wherein:
the determining includes determining that the circuit design lacks an interface between a debug interface control circuit and an address and data bus through the NoC;
the coupling includes:
enabling an address and data bus between the debug cores and the NoC, and
coupling the NoC to the debug interface control circuit.

14. The system of claim 11, wherein:
the instructions for determining include instructions for determining that the circuit design has an interface between a debug interface control circuit and an address and data bus through the NoC;
the instructions for coupling include instructions for specifying NoC routing data between the debug interface control circuit and the debug cores; and
the instructions for synthesizing include instructions for compiling the NoC routing data.

15. The system of claim 11, wherein:
the instructions for determining include instructions for determining that the circuit design lacks a debug interface control circuit and that a number of NoC resources is less than a threshold;
the instructions for creating include instructions for:
instantiating a debug interface control core,
instantiating an address and data bus; and
the instructions for coupling include instructions for coupling the debug interface control core to the debug cores through the address and data bus.

16. The system of claim 11, wherein:
the instructions for determining include instructions for determining that the circuit design has a debug interface control core and that a number of NoC resources is less than a threshold;
the instructions for creating include instructions for instantiating an address and data bus; and
the instructions for coupling include instructions for coupling the debug interface control core to the debug cores through the address and data bus.

17. The system of claim 11, wherein:
the instructions for determining include instructions for determining that the circuit design has a debug interface control circuit and an address and data bus, and that a number of network-on-chip resources is less than a threshold; and
the instructions for coupling include:
instructions for reconfiguring the address and data bus to enable an additional interface, and
instructions for coupling the debug interface control core to the debug cores through the additional interface of the address and data bus.

18. The system of claim 11, wherein:
the instructions for determining include:
instructions for determining that the circuit design specifies first circuitry to be implemented as a static portion of programmable logic of a programmable integrated circuit, and specifies second circuitry to be implemented as a reconfigurable portion of the programmable logic of the programmable integrated circuit, and
instructions for determining that the circuit design lacks a debug interface control circuit, the signals of the circuit design to be probed include signals from the second circuitry;
the instructions for creating include:
instructions for instantiating in the circuit design, the debug cores to be implemented as a reconfigurable portion of the programmable logic,
instructions for instantiating an address and data bus through a network-on-chip (NoC); and
the instructions for coupling include instructions for coupling the debug interface control core to the debug cores through the address and data bus and NoC.

19. The system of claim 18, wherein the memory circuit is configured with instructions that when executed by the processor arrangement cause the processor arrangement to store definitions of the debug cores and interfaces in a constraint file.

20. The system of claim 11, wherein the memory circuit is configured with instructions that when executed by the processor arrangement cause the processor arrangement to couple a clock signal and a reset signal of the circuit design to the debug cores.

\* \* \* \* \*